(12) United States Patent
Peng

(10) Patent No.: US 7,076,078 B2
(45) Date of Patent: Jul. 11, 2006

(54) LCD AND SPEAKER ARRANGEMENT

(75) Inventor: Juen-Tien Peng, Chung Li (TW)

(73) Assignee: Action Electronics Co., Ltd., Chung Li (TW)

( * ) Notice: Subject to any disclaimer, the term of this patent is extended or adjusted under 35 U.S.C. 154(b) by 148 days.

(21) Appl. No.: 10/788,361

(22) Filed: Mar. 1, 2004

(65) Prior Publication Data

US 2005/0147268 A1 Jul. 7, 2005

(30) Foreign Application Priority Data

Jan. 5, 2004 (TW) .............................. 93200123 U

(51) Int. Cl.
*H04R 25/00* (2006.01)

(52) U.S. Cl. ....................... 381/388; 381/306; 381/333

(58) Field of Classification Search ................ 381/300, 381/301, 303–306, 308, 333–336, 386, 388, 381/394; 361/681, 682, 683, 686; 348/836, 348/838; 181/141
See application file for complete search history.

(56) References Cited

U.S. PATENT DOCUMENTS 5,675,426 A * 10/1997 Meisner et al. ............. 348/838
6,191,942 B1 * 2/2001 Lee et al. .................... 361/683

* cited by examiner

*Primary Examiner*—Huyen Le
(74) *Attorney, Agent, or Firm*—Rosenberg, Klein & Lee

(57) ABSTRACT

An LCD and speaker arrangement includes a LCD having two speaker mounting structures at one side, each speaker mounting structure having electric contacts extended from the circuit board of the LCD and an insertion hole, and a speaker, the speaker having two metal mounting plates that are insertable into the insertion holes of the speaker mounting structures to fasten the speaker to the LCD and to electrically connect the electric contacts of the internal circuit of the LCD to the electric contacts in the speaker mounting structures.

22 Claims, 7 Drawing Sheets

LCD AND SPEAKER ARRANGEMENT

BACKGROUND OF THE INVENTION

1. Field of the Invention

The present invention relates to a DVD player and more particularly, to the LCD (Liquid Crystal Display) and speaker arrangement of a DVD player.

2. Description of the Related Art

Following fast development of high technology, various electronic apparatus are made portable for convenient use anywhere. For high mobility, mobile electronic apparatus, such as mobile DVD players, notebook computers, tablet PCs, and etc., are designed to have lighter, thinner, shorter, and smaller features. Further, in order to provide satisfactory sound effect, a mobile DVD player may be used with external speakers. When attaching external speakers to a mobile DVD player, electric wires must be used to electrically connect the speakers to the DVD player. After installation of external speakers in a mobile DVD player, the electric wires must be properly arranged in place. However, because the electric wires are exposed to the outside, they tend to be stretched by an external force accidentally, resulting in a short circuit or damage to the internal circuit of the LCD or each speaker.

SUMMARY OF THE INVENTION

The present invention has been accomplished under the circumstances in view. It is the main object of the present invention to provide a LCD and speaker arrangement, which enables the speaker to be quickly and electrically connected to the LCD through a plug joint without the use of external fastening members. It is another object of the present invention to provide a LCD and speaker arrangement, which keeps the speaker electrically connected to the LCD with the use of an external power cord.

To achieve these and other objects of the present invention, the LCD and speaker arrangement comprises a LCD, the LCD comprising a LCD case, two speaker mounting structures provided at one side of the LCD case at different elevations, the speaker mounting structures each comprising a bracket fixedly mounted inside the LCD case, the bracket comprising a base defining an insertion hole, and a main circuit board mounted inside the LCD case, the main circuit board having electric contacts respectively extended to the inside of each speaker mounting structure; and a speaker, the speaker comprising a speaker case, a voice generating mechanism fixedly mounted inside the speaker case, and two metal mounting plates fixedly mounted inside the speaker case and partially extended out of the speaker case for insertion into the insertion hole of the bracket of each speaker mounting structure of the LCD to fasten the speaker to the LCD and to electrically connect the speaker to the electric contacts of the main circuit board in the speaker mounting structures.

DETAILED DESCRIPTION OF THE PREFERRED EMBODIMENT

Figure 1:
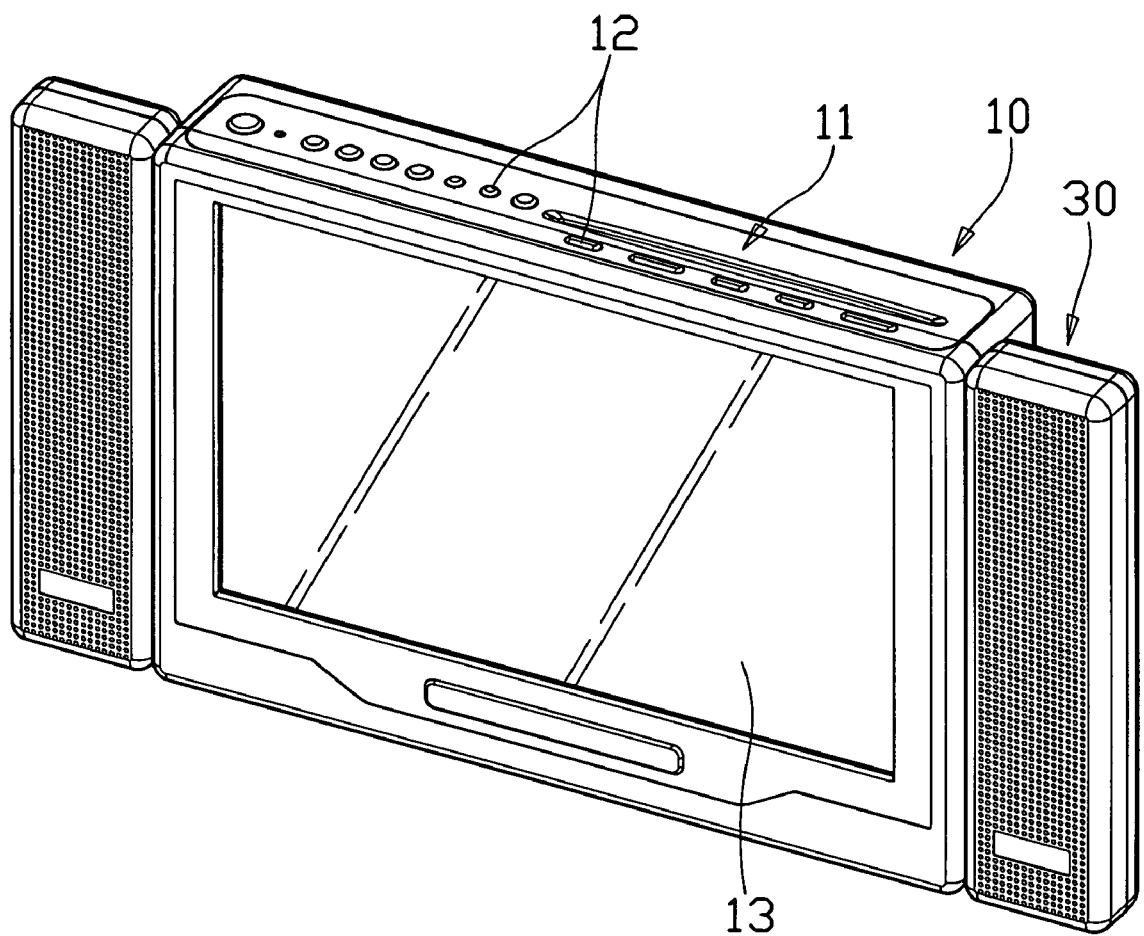
FIG. 1 is an elevational view of the present invention.
Figure 2:
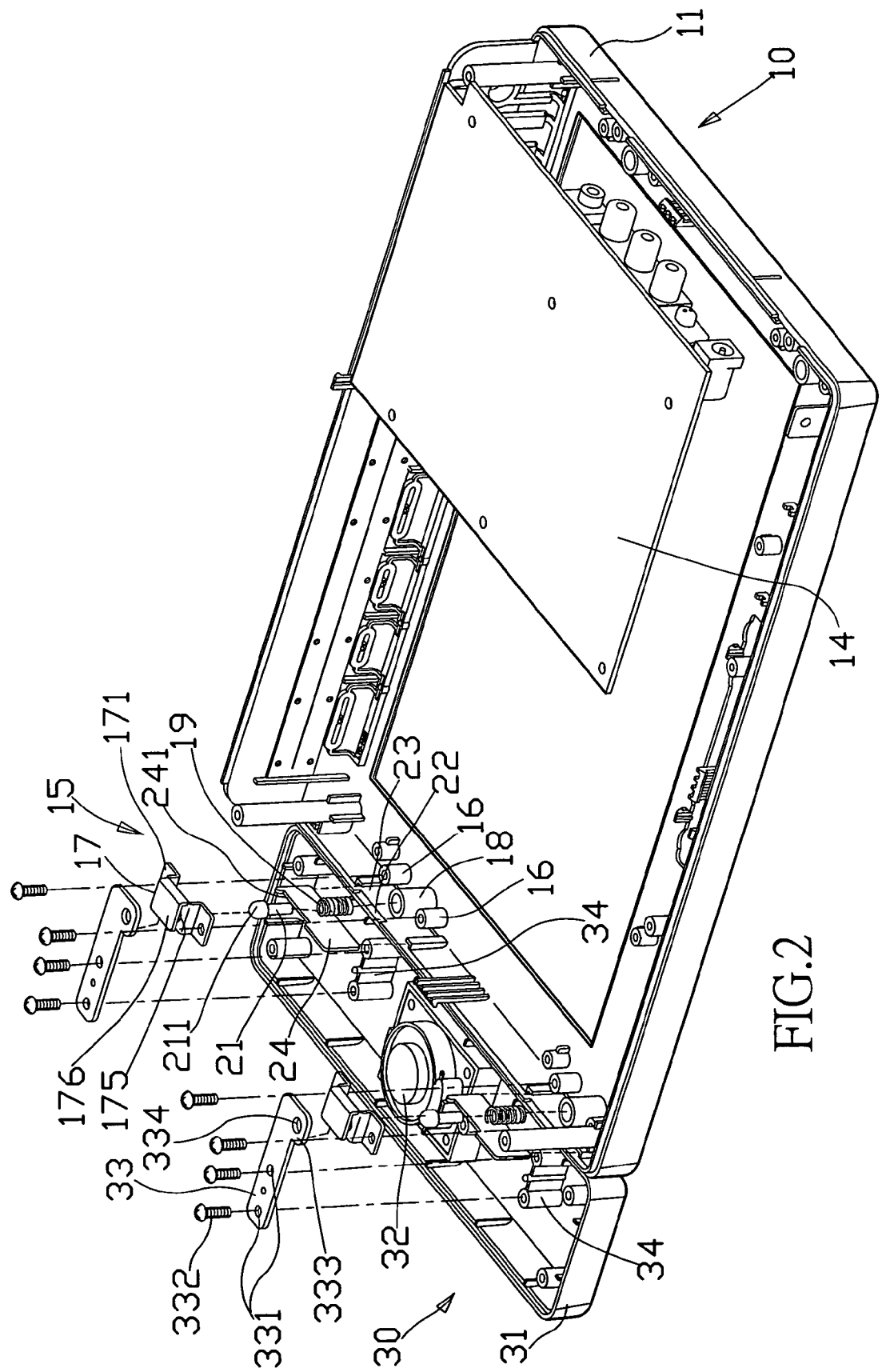
FIG. 2 is an exploded view of the present invention.
Figure 2A:
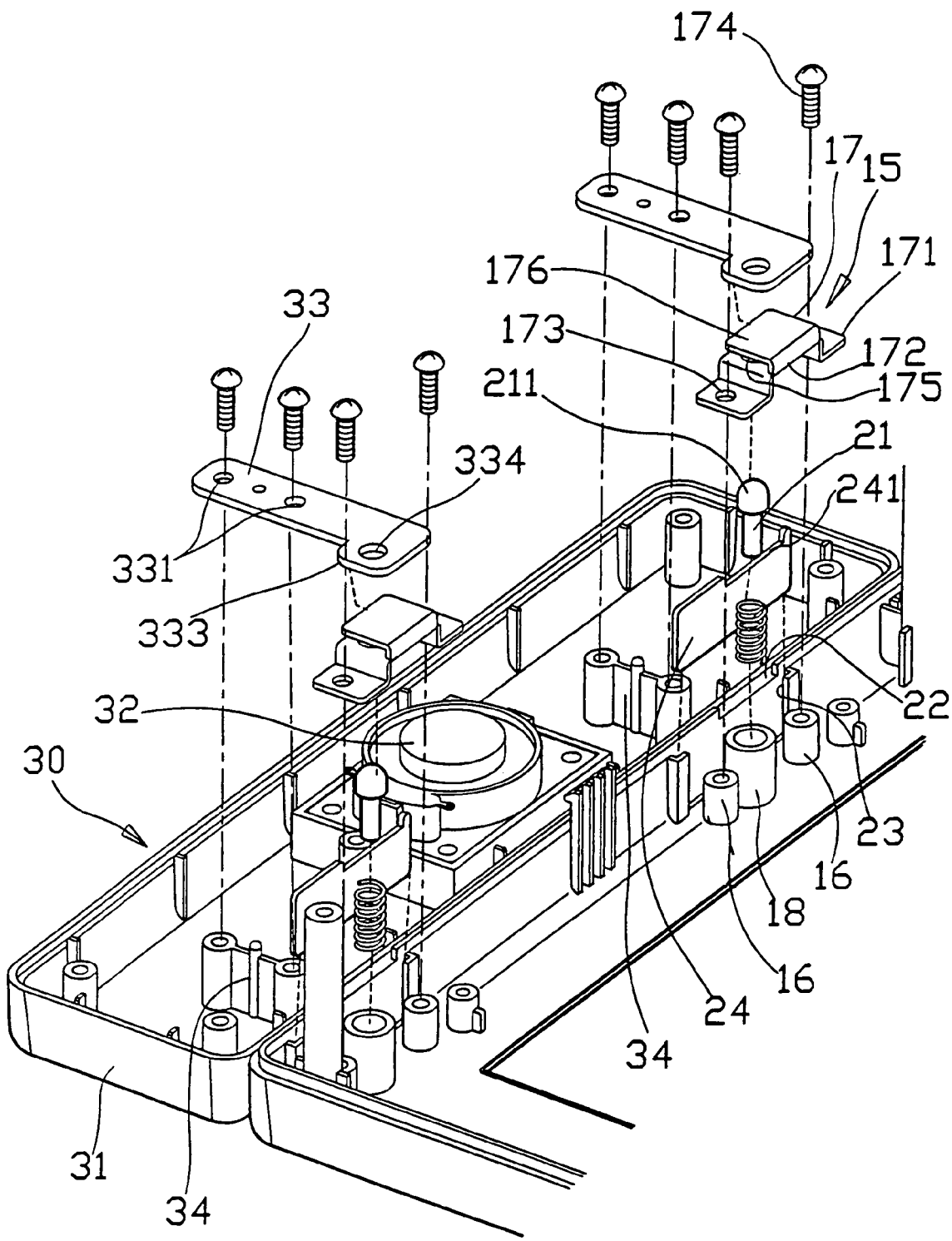
FIG. 2A is an enlarged view of a part of FIG. 2.
Figure 3:
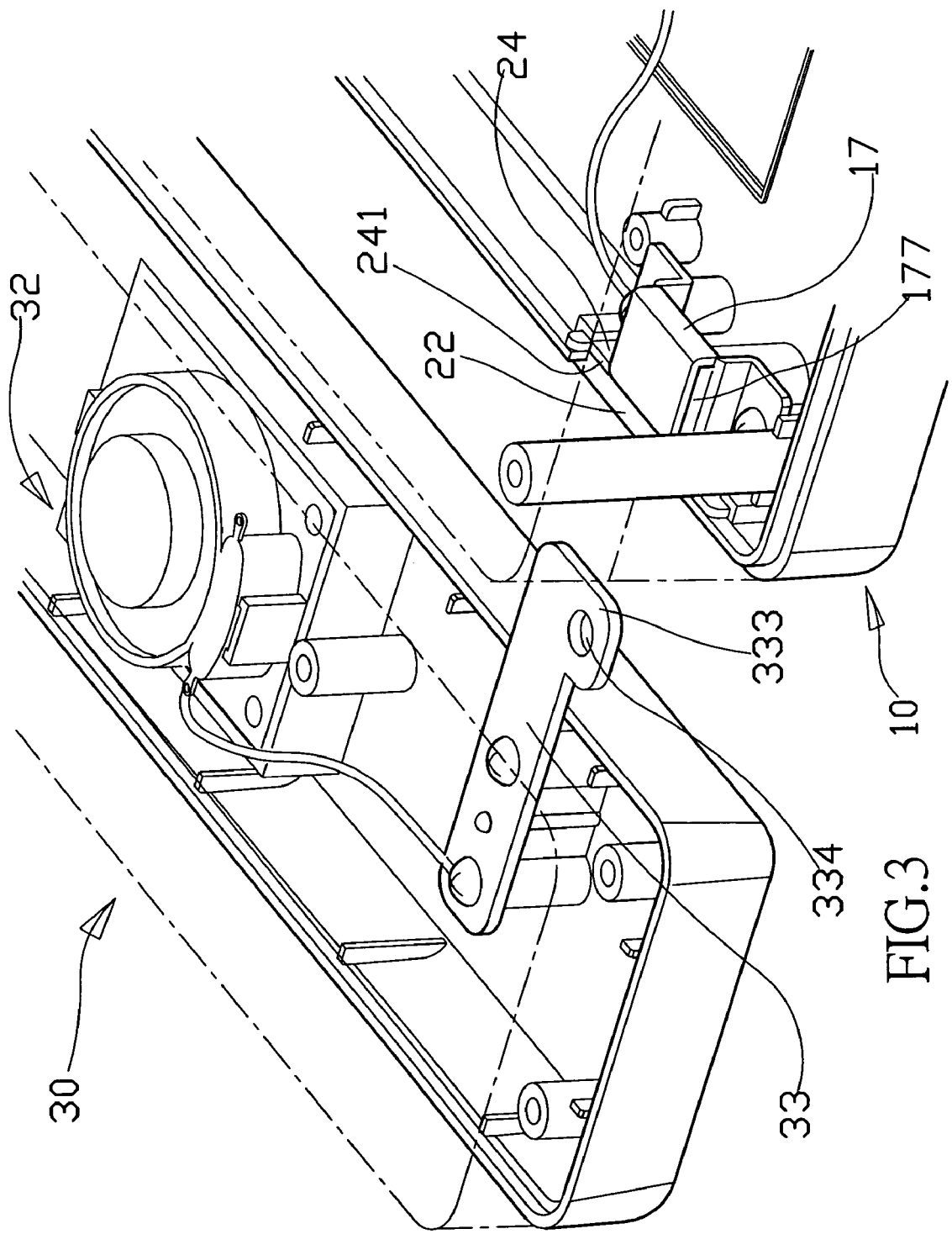
FIG. 3 is an exploded view in an enlarged scale of a part of the present invention before insertion of the mounting plates of the speaker into the respective speaker mounting structures of the LCD.
Figure 4:
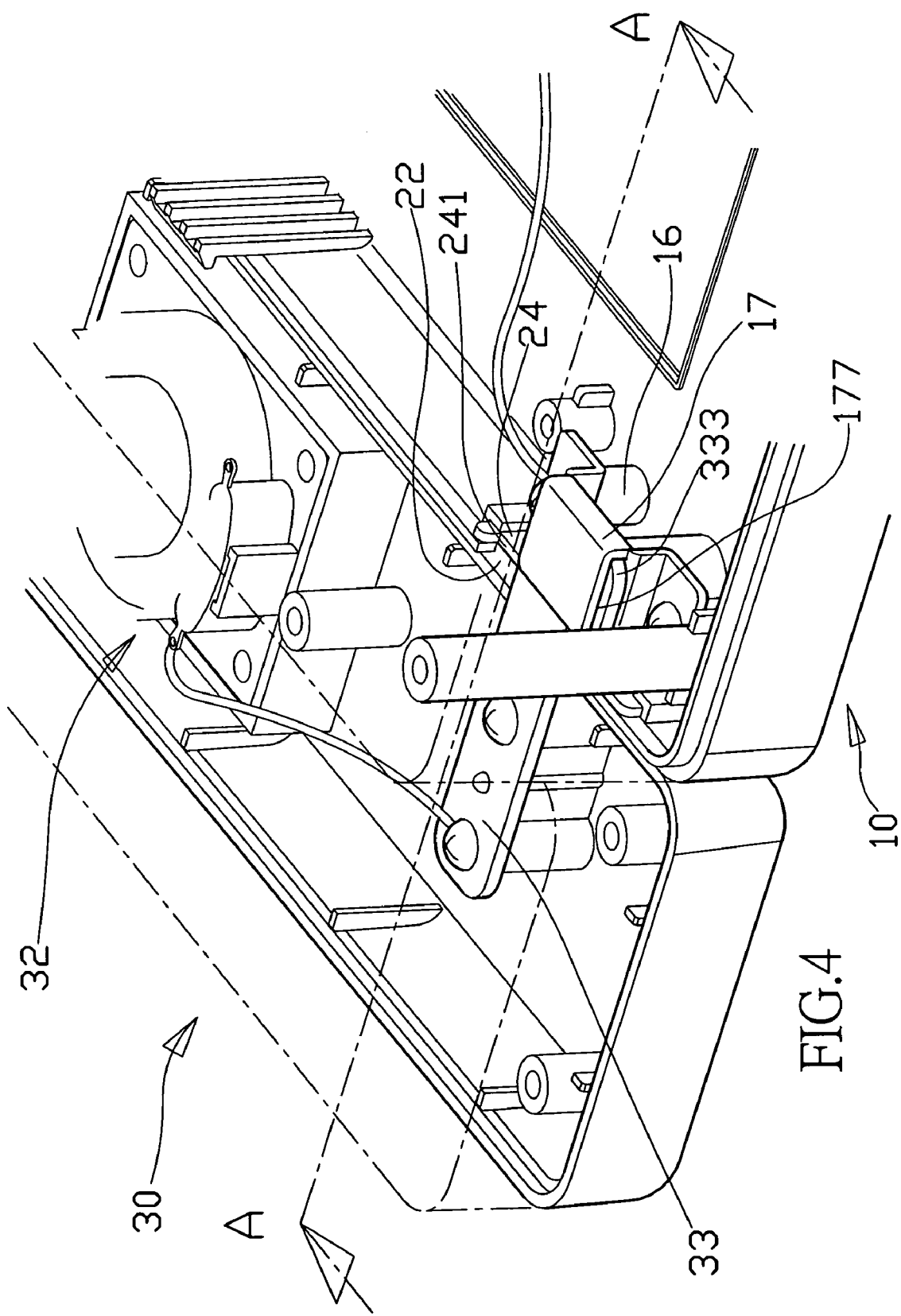
FIG. 4 is similar to FIG. 3 but showing the speaker connected to the LCD.
Figure 5:
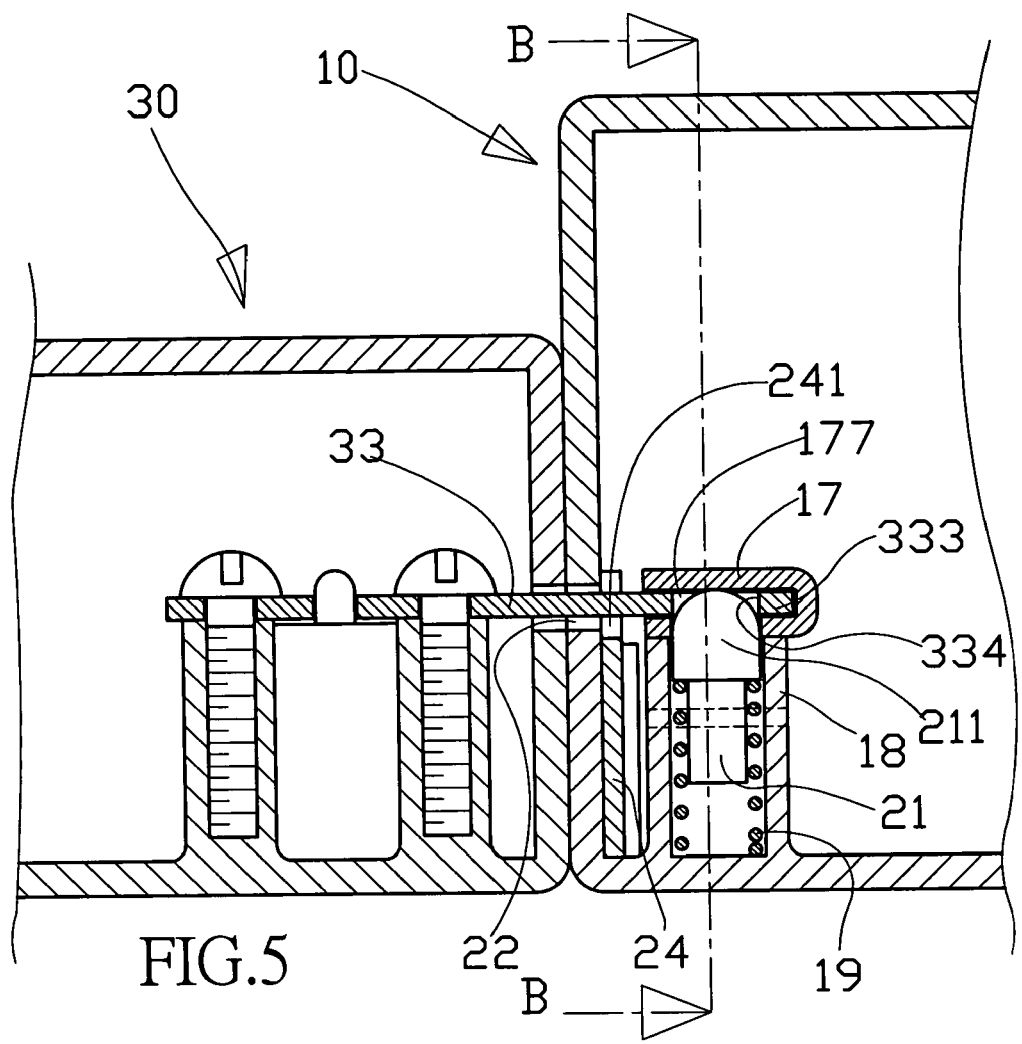
FIG. 5 is a sectional view taken along line A—A of FIG. 4.
Figure 6:
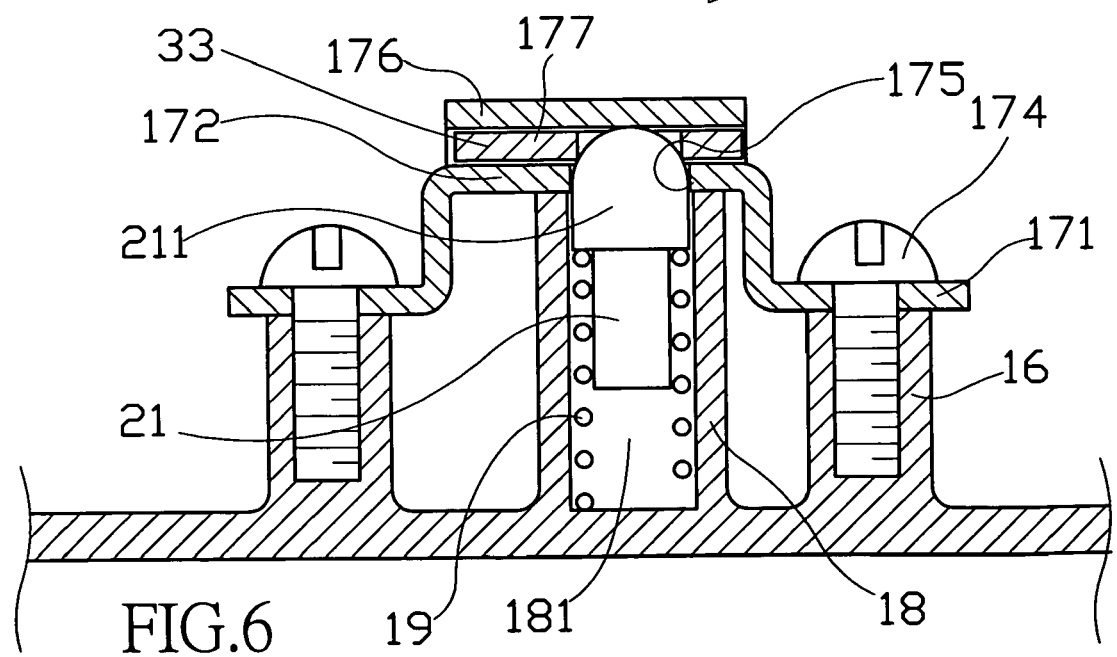
FIG. 6 is a sectional view taken along line B—B of FIG. 5.

Referring to FIGS. 1, 2, 2A, and 3, 2, 3, and 4, the invention comprises a LCD 10 and a speaker 30. The LCD 10 comprises a LCD case 11 (formed of two symmetrical shells), a set of function buttons 12 mounted on the top side of the LCD case 11, a display screen 13 provided at the front side of the LCD case 11, a main circuit board 14 mounted inside the LCD case 11, and four speaker mounting structures 15 symmetrically arranged at two sides of the LCD case 11 at different elevations. Each speaker mounting structure 15 comprises two upright female screws 16, a bracket 17, a support 18, a spring member 19, and a retainer member 21 (see also FIG. 6). The bracket 17 is a metal member comprising a horizontally extended flat base 172 supported on the support 18, two angled mounting lugs 171 respectively downwardly extended from the two opposite lateral sides of the horizontally extended flat base 172 and then turned horizontally outwards, two locating holes 173 vertically cut through the angled mounting lugs 171 and respectively fastened to the upright female screws 16 with a respective screw 174, a through hole 175 formed in the horizontally extended flat base 172 and spaced below the center of the horizontally extended flat base 172, a horizontal top plate 176 extended from and suspended above the horizontally extended flat base 172, and an insertion hole 177 defined between the horizontal top plate 176 and the horizontally extended flat base 172. The support 18 is a hollow cylindrical member spaced between the upright female screw 16, defining a vertically upwardly extended receiving open chamber 181 adapted to accommodate the spring member 19 and the retainer member 21. The retainer member 21 is supported on the spring member 19 in the receiving open chamber 181 of the support 18, having a top head 211 inserted through the through hole 175 and stopped against the horizontal top plate 176. Each speaker mounting structure 15 further comprises a horizontal notch 22 and a vertical slot 23 respectively formed in one lateral side of the LCD case 11 corresponding to the insertion hole 177 of the respective bracket 17, and a metal locating plate 24 fastened to the vertical slot 23. The metal locating plate 24 has a horizontal top notch 241 corresponding to the horizontal notch 22. Further, the main circuit board 14 has positive and negative power contacts and signal contacts respectively extended to the speaker mounting structures 15.

The speaker 30 comprises a speaker case 31, a voice generating mechanism 32 mounted inside the speaker case 31, two screw holders 34 fixedly provided inside the speaker case 31 and equally spaced from the voice generating mechanism 32 at two sides, and two metal mounting plates 33 adapted to fasten the screw holders 34 to the speaker mounting structures 15 at one side of the LCD 10. The mounting plates 33 are respectively connected to the positive and negative power contacts in the respective speaker mounting structures 15, each comprising a plurality of locating holes 331 respectively fastened to the screw holders 34 by screws 332, an extension portion 333, and a retaining hole 334 in the extension portion 333.

Figure 7:
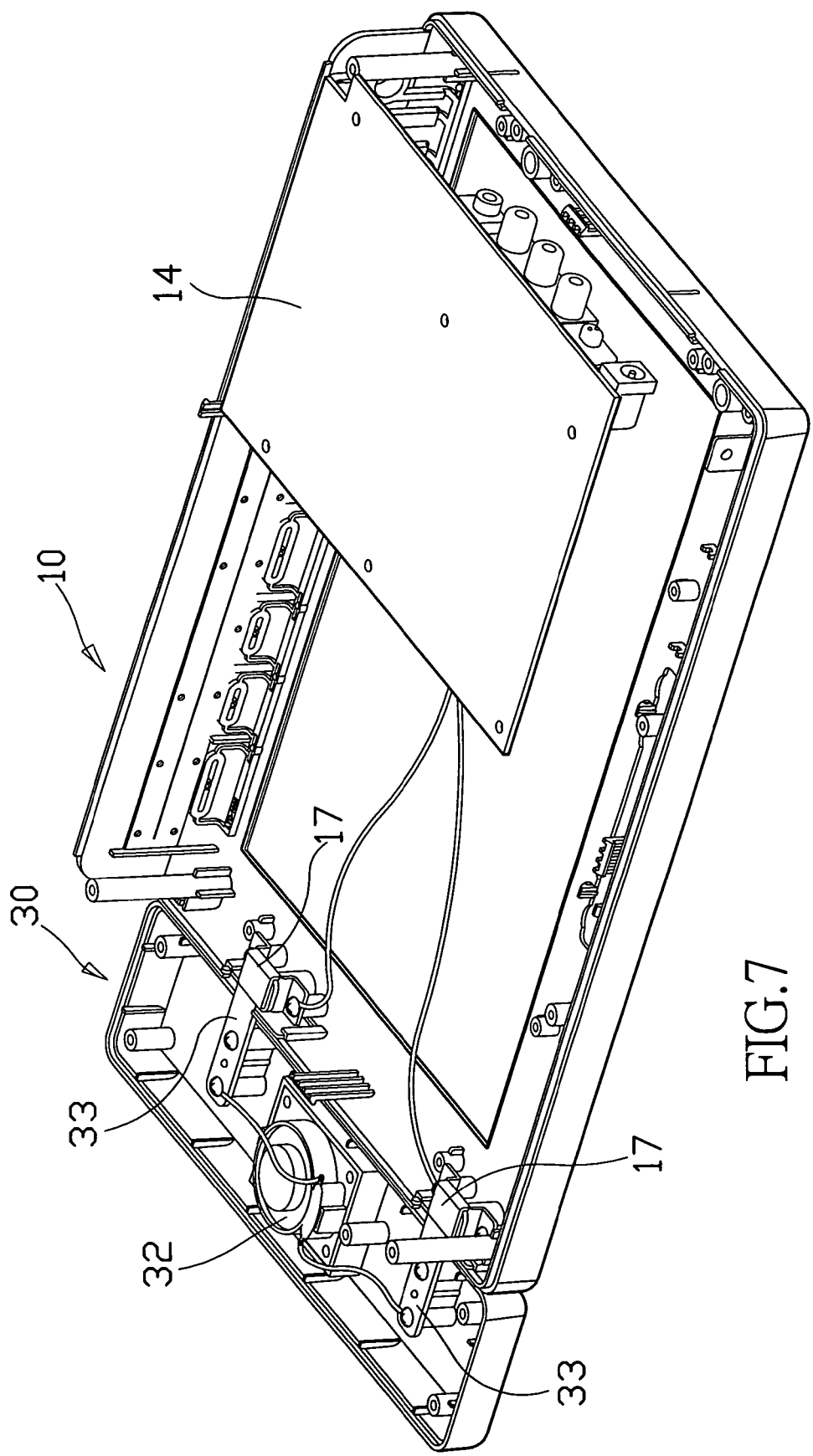
FIG. 7 is a schematic assembly view showing the internal structure of the present invention.

Referring to FIGS. 3~6, the extension portions 333 of the mounting plates 33 of are respectively inserted through the horizontal notch 22 and horizontal top notch 241 of each speaker mounting structure 15 at one side of the LCD 10 into the insertion holes 177 of the respective brackets 17 to force the retaining hole 334 of each mounting plate 33 into engagement with the top head 221 of the respective retainer member 21, finishing the installation of the speaker 30 as shown in FIG. 7.

Simply by means of inserting the mounting plates 33 into the respective speaker mounting structures 15 at one side of the LCD 10, the speaker 30 is quickly installed in the LCD 10. After installation of the speaker 30, the mounting plates 33 electrically connect the positive and negative power terminals of the speaker 30 to the positive and negative power terminals of the main circuit board 14. Further, because the signal output contacts of the main circuit board 14 of the LCD 10 are extended to the inside of the speaker mounting structures 15, upon installation of the speaker 30 in the LCD 10, the speaker 30 and the LCD 10 are electrically connected. Therefore, no addition power cord is necessary to electrically connect the speaker 30 to the LCD 10.

A prototype of LCD and speaker arrangement has been constructed with the features of FIGS. 1~7. The LCD and speaker arrangement functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An LCD and speaker arrangement comprising
a LCD, said LCD comprising a LCD case, two speaker mounting structures provided at one side of said LCD case at different elevations, said speaker mounting structures each comprising a bracket fixedly mounted inside said LCD case, said bracket comprising a base defining an insertion hole, and a main circuit board mounted inside said LCD case, said main circuit board having electric contacts respectively extended to the inside of each said speaker mounting structure; and
a speaker, said speaker comprising a speaker case, a voice generating mechanism fixedly mounted inside said speaker case, and two metal mounting plates fixedly mounted inside said speaker case and partially extended out of said speaker case for insertion into the insertion hole of the bracket of each said speaker mounting structure of said LCD to fasten said speaker to said LCD and to electrically connect said speaker to the electric contacts of said main circuit board in said speaker mounting structures.

2. The LCD and speaker arrangement as claimed in claim 1, wherein said speaker mounting structures each comprise a plurality of upright female screws adapted to hold the respective bracket; the brackets of said speaker mounting structures each comprise a plurality of locating holes respectively fastened to the upright female screws of said speaker mounting structures with screws.

3. The LCD and speaker arrangement as claimed in claim 1, wherein the bracket of each said speaker mounting structure comprises a through hole for positioning.

4. The LCD and speaker arrangement as claimed in claim 3, wherein the through hole of the bracket of each said speaker mounting structure is spaced below the center of the respective bracket.

5. The LCD and speaker arrangement as claimed in claim 1, wherein the bracket of each said speaker mounting structure comprises a top plate extended from and suspended above the respective base and defining with the respective base the respective insertion hole.

6. The LCD and speaker arrangement as claimed in claim 3, wherein said speaker mounting structures each further comprise a hollow support fixedly provided inside said LCD case and adapted to support the respective bracket, a spring member mounted inside said hollow support, and a retainer member supported on said spring member and adapted to retain the mounting plates of said speaker.

7. The LCD and speaker arrangement as claimed in claim 1, wherein said speaker mounting structures each comprise a horizontal notch formed in said LCD case and adapted to receive the mounting plates of said speaker.

8. The LCD and speaker arrangement as claimed in claim 7, wherein said speaker mounting structures each further comprise a vertical slot and a locating plate fastened to said vertical slot and adapted to support the mounting plates of said speaker.

9. The LCD and speaker arrangement as claimed in claim 8, wherein said locating plate has a top notch corresponding to the horizontal notch of the respective speaker mounting structure in said LCD case for receiving the mounting plates of said speaker.

10. The LCD and speaker arrangement as claimed in claim 1, wherein said speaker further comprises two screw holders fixedly provided inside said speaker case; said mounting plates of said speaker each comprise a plurality of mounting holes respectively fastened to the screw holders of said speaker with screws.

11. The LCD and speaker arrangement as claimed in claim 1, wherein said mounting plates of said speaker each have an extension portion extended out of said speaker case for insertion into the insertion hole of each said bracket, said extension portion having a retaining hole for position.

12. A LCD and speaker arrangement comprising:
a LCD, said LCD comprising a LCD case, at least one speaker mounting structure provided at one side of said LCD case, said at least one speaker mounting structure each comprising an insertion hole and a bracket fixedly attached to said LCD case, said bracket including a base having said insertion hole formed therein, and a main circuit board mounted inside said LCD case, said main circuit board having electric contacts respectively extended to the inside of each said speaker mounting structure; and
a speaker, said speaker comprising a speaker case, a voice generating mechanism fixedly mounted inside said speaker case, and at least one metal mounting plate fixedly mounted inside said speaker case and partially extended out of said speaker case for insertion into the insertion hole of each said speaker mounting structure of said LCD to fasten said speaker to said LCD and to electrically connect said speaker to the electric contacts of said main circuit board in each said speaker mounting structure.

13. The LCD and speaker arrangement as claimed in claim 12, wherein each said speaker mounting structure further comprises a plurality of upright female screws fixedly provided inside said LCD case; the bracket of each said speaker mounting structure is fixedly fastened to the upright female screws of the respective speaker mounting structure with screws.

14. The LCD and speaker arrangement as claimed in claim 12, wherein the bracket of each said speaker mounting structure comprises a through hole for positioning.

15. The LCD and speaker arrangement as claimed in claim 14, wherein the through hole of the bracket of each said speaker mounting structure is spaced below the center of the respective bracket.

16. The LCD and speaker arrangement as claimed in claim 12, wherein the bracket of each said speaker mounting structure comprises a top plate extended from and suspended above the respective base and defining with the respective base the respective insertion hole.

17. The LCD and speaker arrangement as claimed in claim 14, wherein each said speaker mounting structure further comprises a hollow support fixedly provided inside said LCD case and adapted to support the respective bracket, a spring member mounted inside said hollow support, and a retainer member supported on said spring member and adapted to retain the at least one mounting plate of said speaker.

18. The LCD and speaker arrangement as claimed in claim 12, wherein each said speaker mounting structure further comprises a horizontal notch formed in said LCD case and adapted to receive the at least one mounting plate of said speaker.

19. The LCD and speaker arrangement as claimed in claim 12, wherein each said speaker mounting structure further comprises a vertical slot and a locating plate fastened to said vertical slot and adapted to support the at least one mounting plate of said speaker.

20. The LCD and speaker arrangement as claimed in claim 19, wherein said locating plate has a top notch corresponding to a horizontal notch of the respective speaker mounting structure in said LCD case for receiving the at least one mounting plate of said speaker.

21. The LCD and speaker arrangement as claimed in claim 12, wherein said speaker further comprises at least one screw holder fixedly provided inside said speaker case; the at least one mounting plate of said speaker each comprises a plurality of mounting holes respectively fastened to the at least one screw holder of said speaker with screws.

22. The LCD and speaker arrangement as claimed in claim 12, wherein the at least one mounting plate of said speaker each comprises an extension portion extended out of said speaker case for insertion into the insertion hole of each said speaker mounting structure, said extension portion having a retaining hole for position.

\* \* \* \* \*